United States Patent [19]

Ooishi et al.

[11] Patent Number: 5,699,524
[45] Date of Patent: Dec. 16, 1997

[54] SYSTEM FOR TRANSFERRING CHARACTER INFORMATION BETWEEN TWO PROCESSING SYSTEMS HAVING DIFFERENT CODING SCHEMES BY BUILDING A CONVERSION TABLE OF CORRESPONDING CHARACTER CODE ADDRESSES

[75] Inventors: Isamu Ooishi, Shizuoka; Megumi Tsukamoto, Kawasaki, both of Japan

[73] Assignee: Fujitsu Limited, Kawasaki, Japan

[21] Appl. No.: 405,968

[22] Filed: Mar. 17, 1995

[30] Foreign Application Priority Data

Mar. 31, 1994 [JP] Japan .................. 6-064101

[51] Int. Cl.⁶ .................. G06F 3/00; H04M 7/00; H04M 7/42
[52] U.S. Cl. .................. 395/200.18; 395/163; 395/192; 395/193; 395/114; 364/951.5
[58] Field of Search .................. 364/900, 200, 364/951.5; 395/162, 500, 120, 163, 200.18, 167, 760, 792, 192, 193, 114, 53; 178/6, 3; 341/90, 106; 358/257

[56] References Cited

U.S. PATENT DOCUMENTS

| | | | |
|---|---|---|---|
| 3,980,809 | 9/1976 | Cook | 178/6 |
| 4,386,416 | 5/1983 | Giltner et al. | 364/900 |
| 4,476,347 | 10/1984 | Hagen et al. | 178/3 |
| 4,559,614 | 12/1985 | Peek et al. | 364/900 |
| 4,672,459 | 6/1987 | Kudo | 358/257 |
| 4,754,428 | 6/1988 | Schultz et al. | 364/900 |
| 4,768,164 | 8/1988 | Dreher | 364/900 |
| 4,791,558 | 12/1988 | Chaitin et al. | 364/200 |
| 4,858,114 | 8/1989 | Heath et al. | 364/200 |
| 4,897,799 | 1/1990 | Le Gall et al. | 364/514 |
| 5,138,697 | 8/1992 | Yamamoto et al. | 395/120 |
| 5,241,625 | 8/1993 | Epard et al. | 395/163 |
| 5,298,731 | 3/1994 | Ett | 238/494 |
| 5,379,376 | 1/1995 | Bednowitz | 395/162 |
| 5,389,924 | 2/1995 | Ogawa | 341/106 |
| 5,479,167 | 12/1995 | Murakami | 341/90 |
| 5,493,671 | 2/1996 | Pitt et al. | 395/500 |
| 5,511,156 | 4/1996 | Nagasaka | 395/133 |

FOREIGN PATENT DOCUMENTS

| | | |
|---|---|---|
| 2-255978 | 10/1990 | Japan . |
| 3-246761 | 11/1991 | Japan . |

*Primary Examiner*—Thomas C. Lee
*Assistant Examiner*—Ki S. Kim
*Attorney, Agent, or Firm*—Staas & Halsey

[57] ABSTRACT

In a distributed information processing system which is capable of transmitting a character string as information with first and second character string storing means which are based on character coding schemes and connected to each other over telecommunication line, there is provided a code conversion means for converting a character string outputted from said first character string storing means into a character code based on the character coding scheme in said second character string storing means, so that the external character can be uniformly dealt with between platforms connected through a network.

6 Claims, 8 Drawing Sheets

FIG. 5

15 —
| OK FLAG | |
|---|---|
| MODE FOR EXECUTING CODE CONVERSION DEFINITION | |
| ORIGINAL CODE SYSTEM LENGTH | OPPONENT CODE SYSTEM LENGTH |
| CIRCULATING SIDE CODE SYSTEM | |
| CIRCULATED SIDE CODE SYSTEM | |
| CHARACTER WIDTH SIZE | CHARACTER HEIGHT SIZE |
| LETTER WIDTH SIZE | LETTER HEIGHT SIZE |
| CHARACTER DATA SIZE | |
| EXPORT CHARACTER NUMBER | |
| EXPORT CODE LIST LENGTH | |

16 —
| CIRCULATING SIDE CHARACTER CODE |
|---|
| CIRCULATED SIDE CHARACTER CODE |
| ⋮ |
| |

17 —
| CIRCULATING SIDE CHARACTER CODE |
|---|
| CHARACTER PATTERN DATA |
| ⋮ |

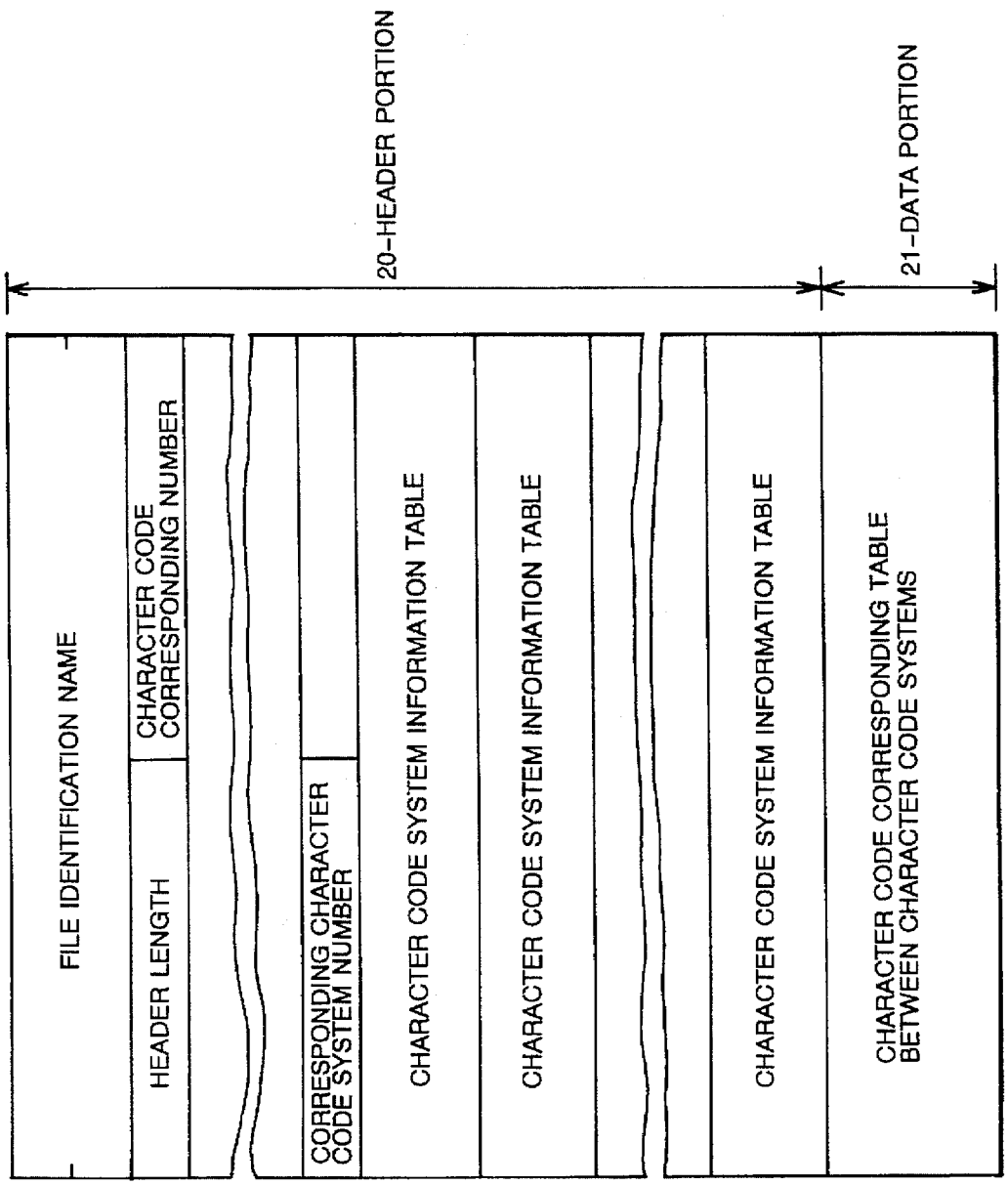

SYSTEM FOR TRANSFERRING CHARACTER INFORMATION BETWEEN TWO PROCESSING SYSTEMS HAVING DIFFERENT CODING SCHEMES BY BUILDING A CONVERSION TABLE OF CORRESPONDING CHARACTER CODE ADDRESSES

BACKGROUND OF THE INVENTION

In the case where information processing systems are distributed, for example, so as to make data circulated between the systems located at remote places and processed, there arises a problem as to how to unify the treatment of character coding schemes which are different depending on hardware, in particular, external characters.

If a description is given in more detail, when data between different platforms (for example, between a mainframe a work station and a personal computer, which are connected through a telecommunication line) are intended to be uniformly dealt with, the character coding schemes (particularly, character coding schemes other than the standard characters, which are called external characters are usually different between the respective platforms, depending on hardware makers, or the kinds of hardware even though it has been made by the same maker. This problem is remarkable particularly in the case where Japanese or characters which are constituted by many kinds of characters are used as the character code of the information processing system.

As an example, in Japanese, in the case of dealing with characters which are not supported by the standard JIS, character fonts must be prepared individually by use of font editors or the like an every platform. Hence, making each of the platforms to be associated with the character font must dependent on the manual operation of an operator.

In this point, Japanese Patent Unexamined Publication No. Hei 3-246771 discloses that an external character table which is provided in an external storage so as to compare external characters used in an original document file with external characters existing in a copying document file and to store the identical external character in the external storage. When there exists no identical external character, the external character of the original document file is copied in a copying external character saving means, and the association of the character code of the external character with a position of storage in the external character saving means is stored in the external character management table.

However, in the above conventional device, because it is assumed that the external characters are managed in the identical platform (a single kind of word processor is assumed in the above conventional device), the conversion of the external characters cannot be made in systems having a different coding scheme (for example, in the case where a user-definable code area per se is different between a mainframe and a UNIX work station) and there exists no associated code per se.

Moreover, in the above conventional device, with the character codes for external characters being managed for every document, surplus information is added to each document (each data). Therefore, in the case of considering the circulation of data for communication, the amount of data is increased, which is not real.

SUMMARY OF THE INVENTION

The present invention has been made in view of the above, and an object of the invention is to provide a system which is capable of uniformly dealing with external characters between platforms connected to each other over a network.

The above object of the invention has been achieved by the provision of a character code managing device in a distributed information processing system which is capable of transmitting a character string as information with first and second character string storing means which are based on character coding schemes and connected to each other over a telecommunication line, which includes code conversion means for converting a character string outputted from said first character string storage means into a character code based on the character coding scheme in said second character string storing means.

With such a code conversion means, because the character code to be registered in the second character string storing means is designated when the character string is outputted from the first character string storing means to the telecommunication line, the character code defined by the external character in said first character string storing means can be surely registered in the second character string storing means. Therefore, in the distributed processing systems connected over the telecommunication line, the external character can be uniformly dealt with.

Also, said code conversion means is comprised of a code conversion table for converting the character code in said first character string storing means into the character code in said second character string storing means.

With the code conversion table thus provided as the code conversion means, the conversion of the external code to be registered from the first character string storing means into the second character string storing means can be remarkably facilitated.

Moreover, said code conversion means includes a character pattern processor for taking the character pattern from said first character string storing means and for making the character pattern applied to the corresponding character code in the second character string storing means to output the character code to the telecommunication line 3.

Thus, the character pattern per se is circulated over the telecommunication line by means of the pattern processor, whereby the character pattern prepared by the first character string storing means can be used in the second character string storing means without any processing. Thus, it is unnecessary to reproduce the character pattern every platform (every character string storing means), thereby being capable of effectively managing the character pattern.

Moreover, said code conversion means includes a function for transmitting the conversion information registered in said code conversion code pertaining to said first character string storing means to the code conversion table pertaining to said second character string storing means through the telecommunication line.

Thus, the information per se of the code conversion table is circulated over the telecommunication line so that updating of the definition of conversion between the platforms is remarkably facilitated, thereby being capable of more complete uniform management of the external characters between the platforms.

BRIEF DESCRIPTION OF THE DRAWINGS

FIG. 5 is a diagram showing the format of delivery data;

FIG. 8 is a diagram showing the format when the information of the code conversion table is circulated.

BRIEF DESCRIPTION OF THE PREFERRED EMBODIMENTS

Now, a description will be given in brief of the concept of the present invention.

Figure 1:
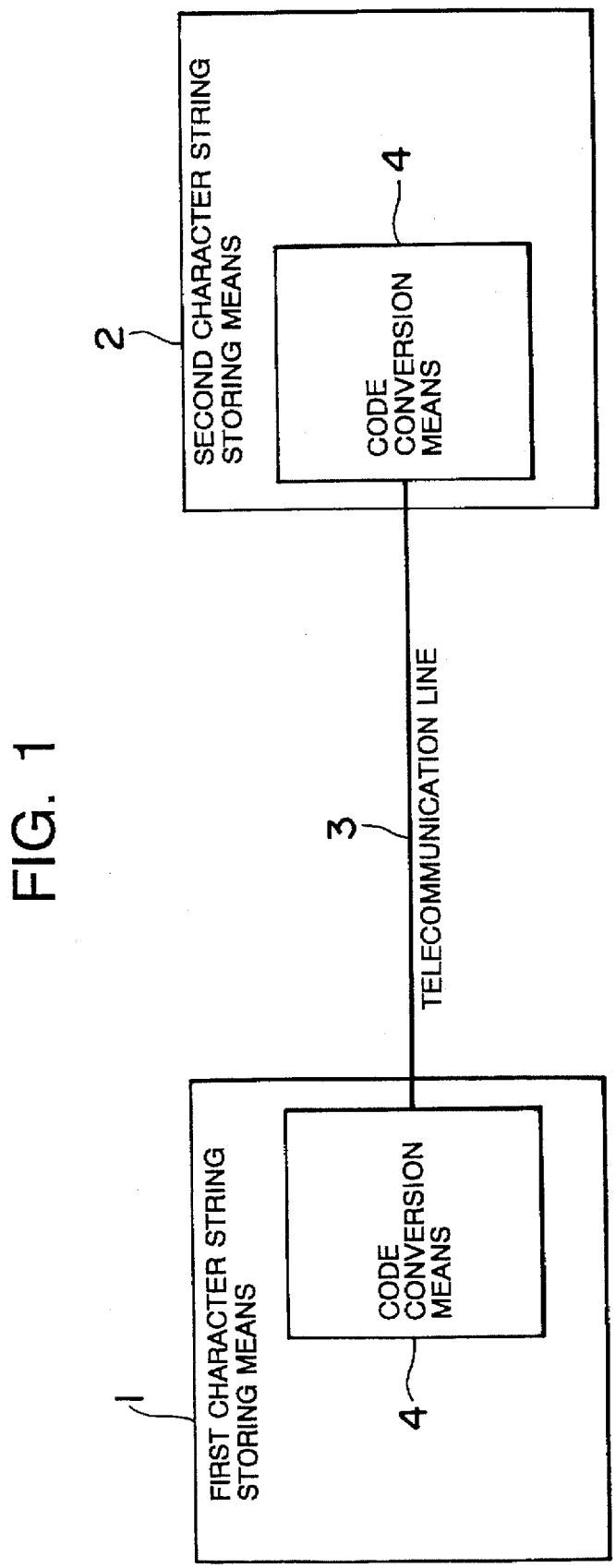
FIG. 1 is a diagram showing a fundamental concept of the present invention.

As shown in FIG. 1, in distributed information processing systems capable of transmitting a character string as information by connecting between a first character string storing means 1 and a second character string storing means 2 over a telecommunication line 3, both are based on character coding schemes, there are provided code conversion means 4 for converting the character string outputted from said first character string storing means 1 into a character code based on the character coding scheme in said second character string storing means 2. The code conversion means 4 may include a code conversion table for converting the character code in said first character string storing means 1 into the character code in said second character string storing means 2.

Also, the code conversion means 4 may include a character pattern processor for taking the character pattern from said first character string storing means 1 and for making the character pattern thus taken applied to the character code in the second character string storing means 2 to output it to the telecommunication line 3.

Further, the code conversion means 4 may include a conversion information communicating means for transmitting the conversion information registered in said code conversion table pertaining to said first character string storing means 1 to the code conversion table pertaining to said second character string storing means 2 via the communication line 3.

Subsequently, a description will be given of an embodiment for realizing the above concept with reference to the accompanying drawings.

(DESCRIPTION OF THE SYSTEM STRUCTURE)

Figure 2:
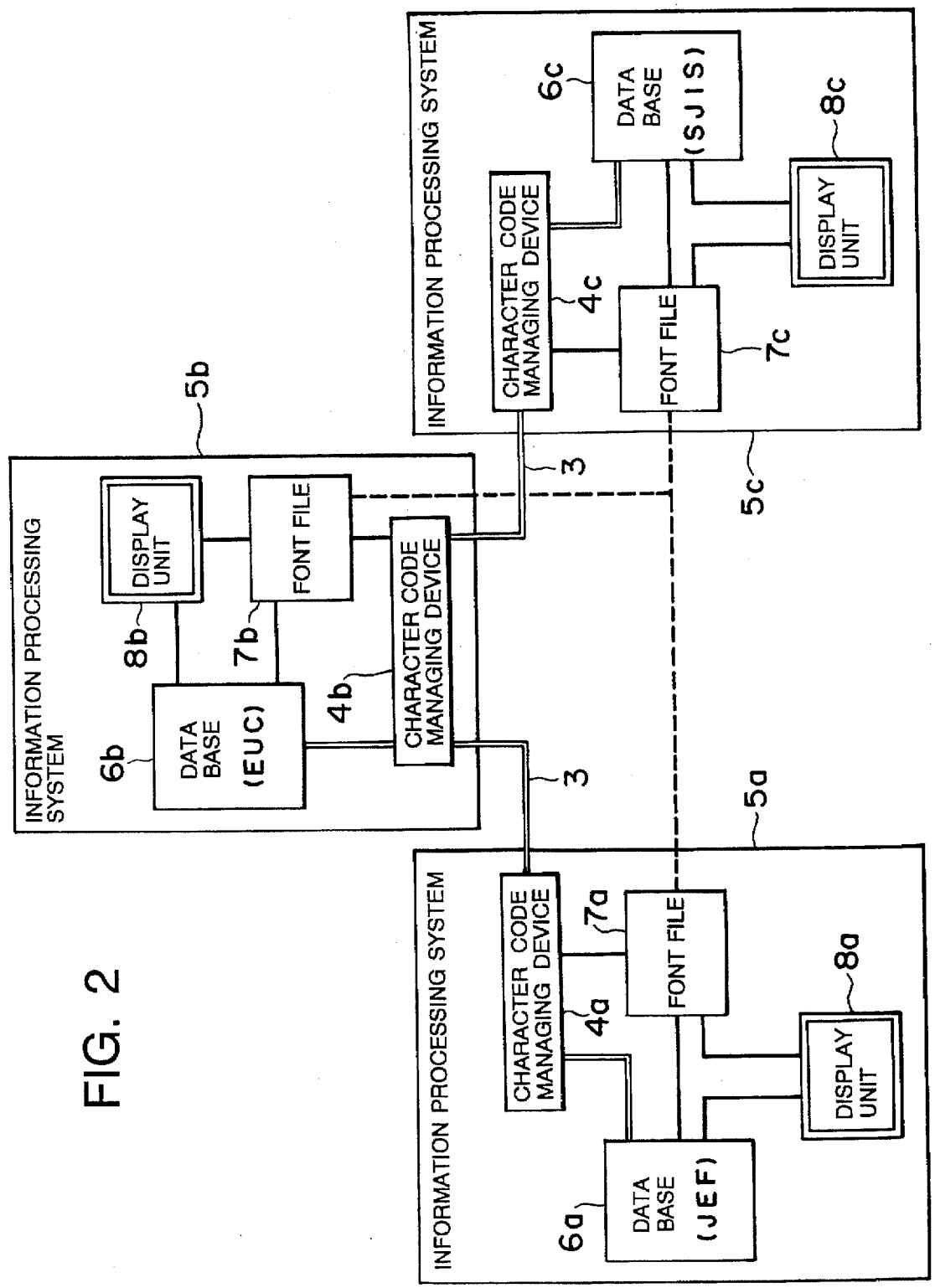
FIG. 2 is a block diagram showing the structure of a system in accordance with the present invention.

FIG. 2 shows the structure of distributed information processing systems in accordance with an embodiment of the present invention. This embodiment refers to an example of a distributed processing in a network such as a financial agency, in which a head office includes an information processing system 5a constituting a mainframe, an area center branch office includes an information processing system 5b constituting a work station, and a branch office includes an information processing system 5c constituting a personal computer. Thus, each office has a different platform.

The information processing systems have databases 6a, 6b and 6c such as a list of customers, respectively.

It is assumed that each of those databases has a different character coding scheme, as well as a different code address of a user area. For example, the JEF code is used for the mainframe 6a, the EUC code for the work station 6b, and the shift JIS code for the personal computer 6c. Hence, the respective external character area codes are also different from each other.

The databases 6a, 6b and 6c have font files 7a, 7b and 7c, respectively, and the character patterns defined by the character codes registered in the external character areas are read out of the font files 7a, 7b and 7c, and then displayed on respective display units 8a, 8b and 8c.

The respective information processing systems 5a, 5b and 5c include character managing devices 4a, 4b and 4c, respectively. The structure of those character managing devices 4a, 4b and 4c will be described below.

(DESCRIPTION OF THE CHARACTER CODE MANAGING DEVICE)

Figure 3:
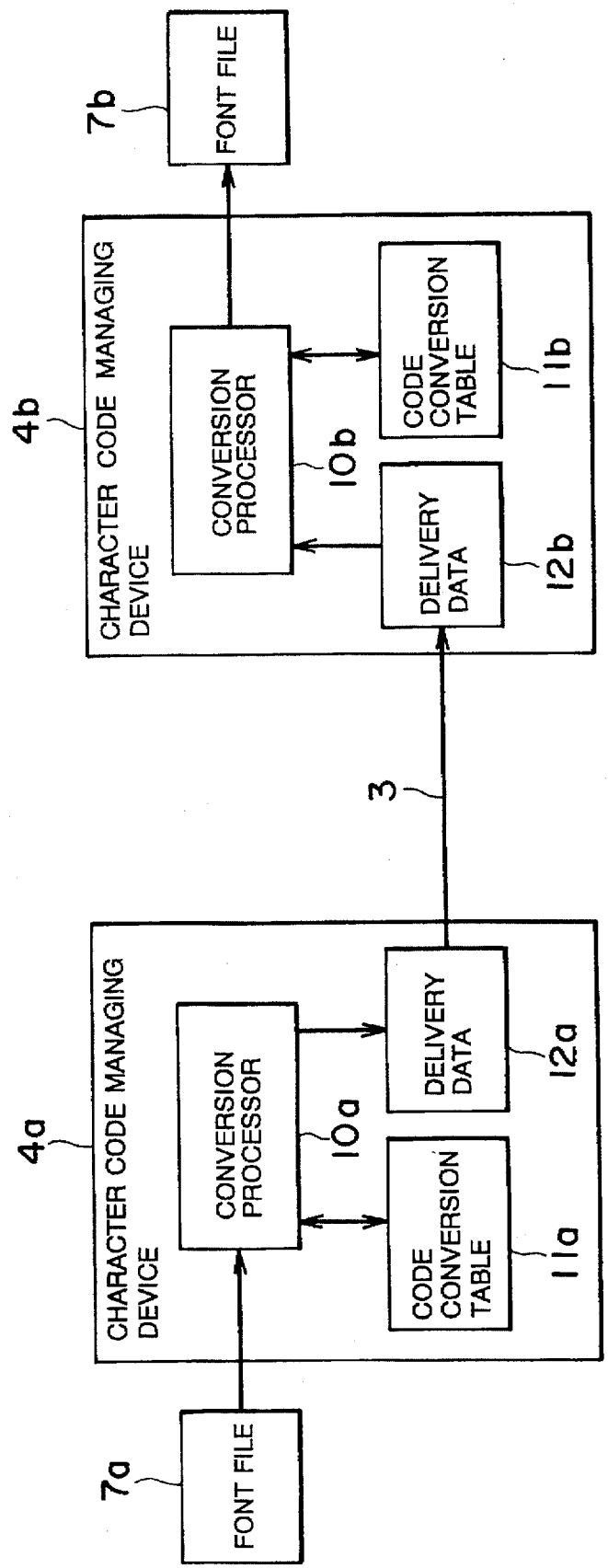
FIG. 3 is a block diagram showing the structure of a character code management device.

FIG. 3 shows the structure of the character code managing device in more detail.

In the figure, for simplification of the description, there is shown the structure of allowing the external character information to be circulated from the information processing system 5a constituting the mainframe of the head office to the information processing system 5b constituting the work station of the area center branch office.

In the figure, the character code managing device 4a and 4b are comprised of conversion processors 10a and 10b, code conversion tables 11a and 11b, and delivery data 12a and 12b, respectively. In more detail, the code conversion tables 11a and 11b and the delivery data 12a and 12b are registered within RAMs or memories in the form of files.

The code conversion tables 11a and 11b are obtained for example, by modifying the definition for conversion of the external character into a table, and designed to regulate to which character code of the reception side information processing system 5b the external character defined by the transmission side information processing system 5a corresponds.

In this embodiment, the transmission side conversion processor 10a and the reception side conversion processor 10b are different in function. In other words, the transmission side conversion processor 10a functions to read the character pattern from the font file 7a and to convert the reception side character code corresponding to the character code to which the character pattern thus read has been assigned into another code on the basis of the code conversion table 11a, to thereby transmit the converted code to the reception side character code managing device 4b through the telecommunication line 3 as delivery data.

On the other hand, the reception side character code managing device 4b, upon reception of the delivery data 12b from the transmission side character code managing device 4a, operates to register the delivery data 12b into the code conversion table 11b. With this operation, the respective conversion tables 11a and 11b are uniformly updated, thereby realizing the uniform management at the time of circulating the external character.

(PROCESSING FLOWCHART FOR TRANSMISSION SIDE CONVERSION PROCESSOR)

Figure 4:
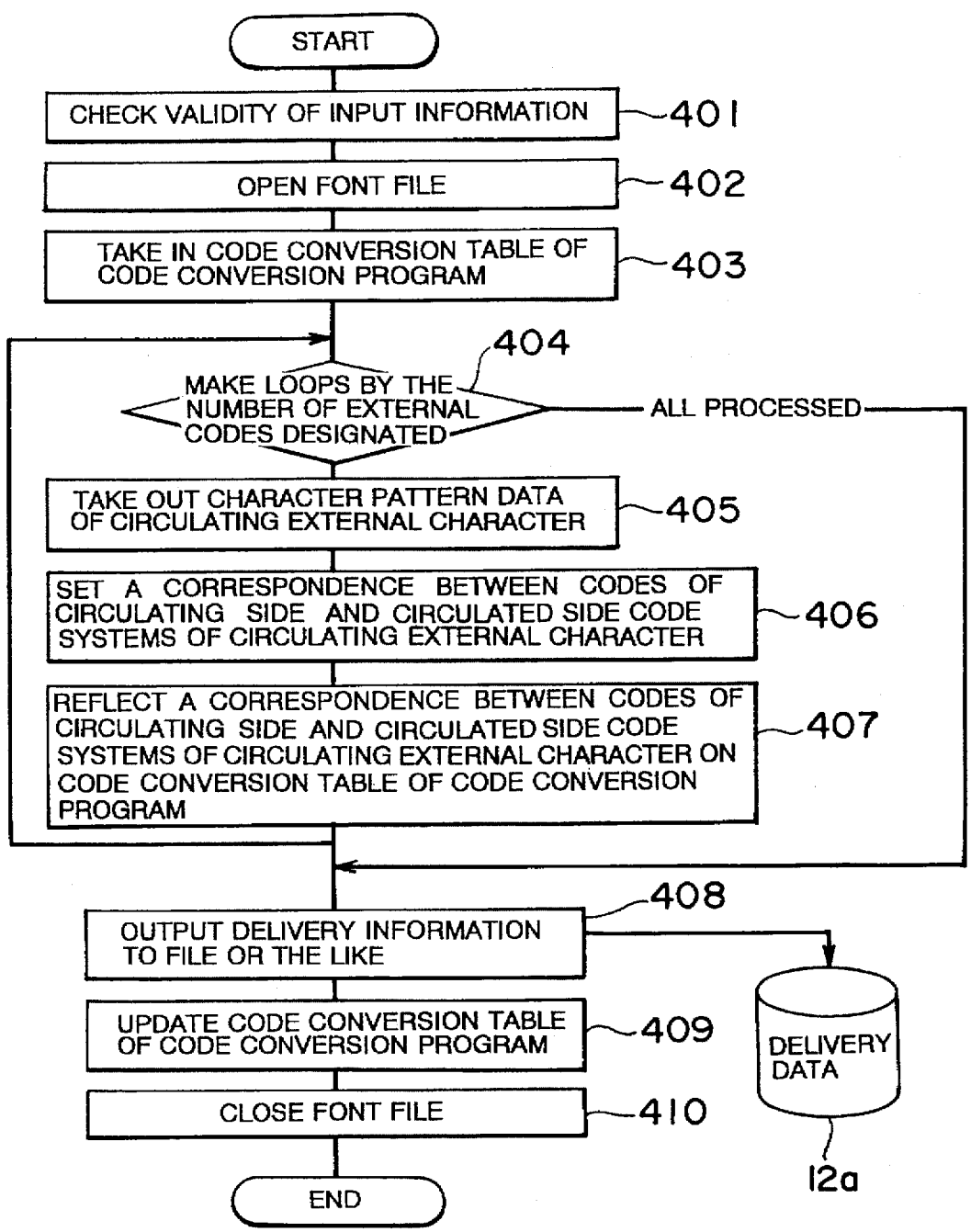
FIG. 4 is a flowchart showing processing steps of a transmission side conversion processor.

FIG. 4 shows the processing of the transmission side conversion processor 10a in more detail.

First, in the transmission side conversion processor 10a, there is checked a validity of input information as to whether or not there is an error in user's input operation, or whether or not a parameter is correct (Step 401).

Subsequently, the font file 7a is opened and developed on a memory in the conversion processor 10a (Step 402).

Then, the code conversion table 11a is read into the conversion processor 10a (Step 403).

Thereafter, the conversion processor 10a reads the number of character patterns in the font file 7a, and sets that number as the number of times of loops in a counter provided therein (Step 404). That counter is realized by software in the memory within the conversion processor.

Then, the character pattern data of the external character is read from the font file 7a (Step 405).

Next, a correspondence between the circulating side code system (JEF code system in this embodiment) of the external character to be circulated (outputted to the telecommunication line 3) and the circulated side code system (EUC code system in this embodiment) is set (Step 406). Setting of the correspondence is executed in such a manner that the registered code address of the user's external character in the JEF code system and the registered code address of the user's external address in the EUC code system are predetermined, and a given address value is added to a value of one registered code address to thereby calculate a corresponding value of the other registered code address.

The transmission side conversion processor 10a can calculate to which code address of the circulated side the external character read from the font file 7a is applied, on the basis of the correspondence between both the codes thus obtained. Then, the correspondence obtained in Step 406 is written in the code conversion table 11a developed on the memory (Step 407).

After the above-mentioned steps 404 to 407 are repeated by the number of character codes of the external characters designated, the transmission side conversion processor 10a outputs the correspondence between the external code and the character pattern data obtained through the above processing to a file as the delivery data 12a (Step 408).

Then, the code conversion table 11a updated on the basis of the above proceeding is written in the storage device (Step 409), and thereafter the font file 410 is closed (Step 410).

(STRUCTURE OF THE DELIVERY DATA)

FIG. 5 shows the format of the delivery data 12a.

The delivery data 12a includes a header portion 15, a list portion 16 and a character data portion 17.

An "OK flag" positioned at the head of the header portion 15 indicates the normal completion of export of the character data, where "0" is registered as a normal completion value. In the case of an abnormal completion, a value other than "0" is registered.

In a "mode of executing code conversion definition", "0" is registered as a standard mode, and "1" is registered at the time of indicating the export updating whereas "2" is registered at the time of indicating the import updating.

In an "original code system length" and an "opponent code system length", the circulating side and circulated side code system lengths (7 or 9 bits) are registered, respectively.

In a "circulating side code system" and a "circulated side code system", code names preset every platform are registers, respectively. If the circulating side is constituted by a mainframe as in this embodiment and has the EBCDIC code system formed by the JEF code as well as the Ascii code, the code name "JefAscii" is designated. If the circulated side is constituted by a work station adopting the EUC code, the code name "EUC" is designated. A "circulated side code system" allows a NULL code to be registered in the case of the standard mode or import updating mode.

In "character width size", "character height size", "letter width size" "letter height size" and "character data size", information as to the size of characters to be circulated is registered. This is because the character size in the circulating side is also reflected on the circulated side.

In an "export character number", the number of characters to be stored as a file in the delivery data is registered. In an "export code list length", the length of a code list to be sent out is registered.

In the list portion 16, the "circulated side character code" and the "circulating side character code" are paired with each other and registered by the required number of characters. In the "circulated side character code", the character code based on the "circulated side character code system" registered in the above header portion 15 is registered. In the "circulating side character code", the character code based on the "circulated side character code" registered in the header portion 15 is registered. In the "circulated side character code", the NULL code is registered at the time of the standard mode or import updating mode.

The list portion 16 is prepared also with the character code where no character (external character) exists. Therefore, the "export code list length" in the header portion 15 which was described above does not coincide with the number of characters (the number of external characters) which are actually sent out.

In the character data portion 17, the "circulating side character code" and the "character pattern data" (font) are paired and registered.

(PROCESSING FLOWCHART OF THE RECEPTION SIDE CONVERSION PROCESSOR)

Figure 6:
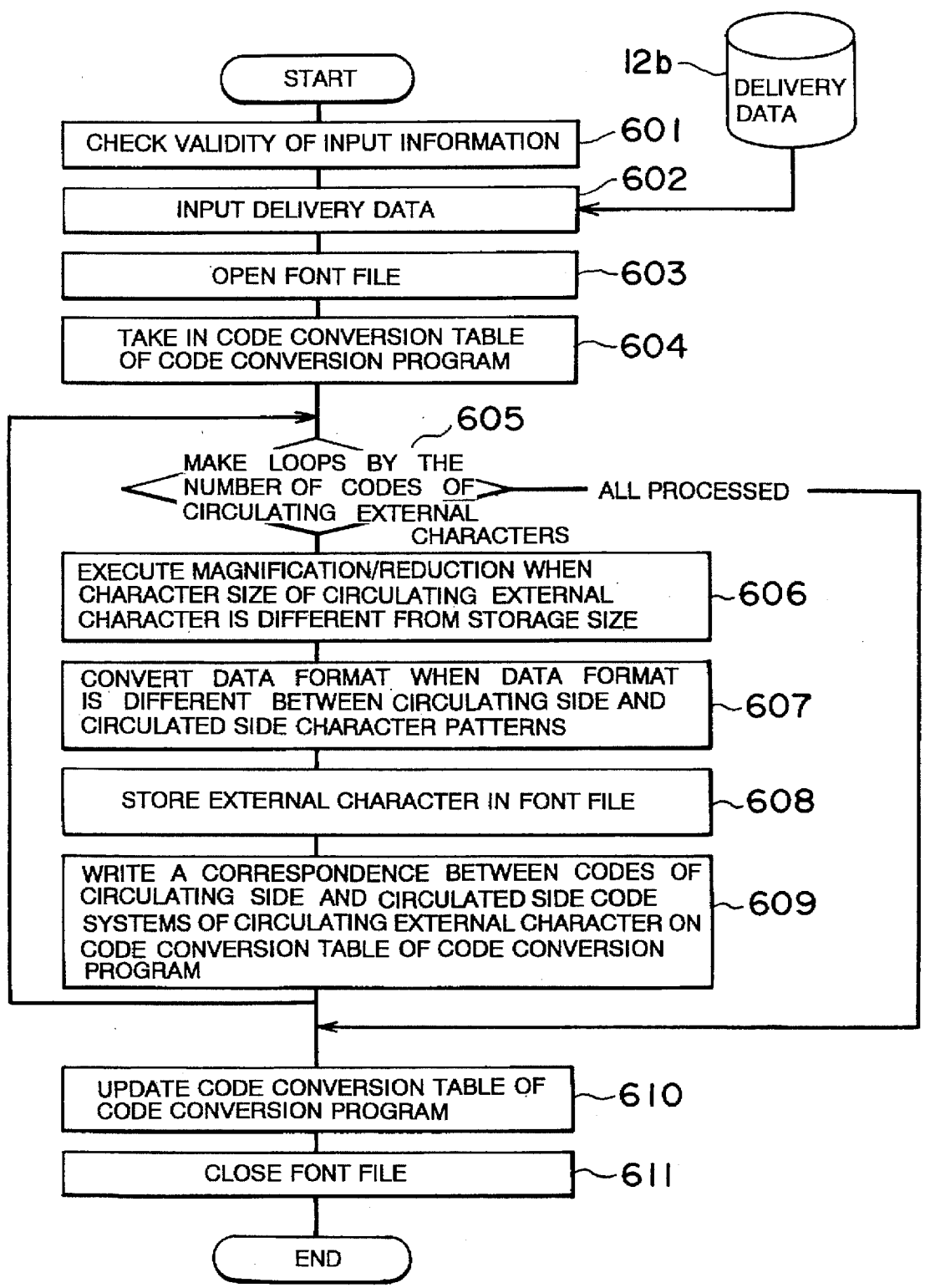
FIG. 6 is a flowchart showing processing steps of a reception side conversion processor.

FIG. 6 shows the processing flowchart in the reception side conversion processor 10b.

In the reception side character code managing device 4b, after the validity of the delivery data received through the telecommunication line 3 is first checked (Step 601), the delivery data 12b is read in the conversion processor 10b (Step 602).

Subsequently, the font file 7b of the reception side conversion processor is read and developed on the memory (Step 603). Then, the code conversion table 11b is read and then developed on the memory likewise (Step 604).

Thereafter, the conversion processor 10b sets the number of external characters obtained from the delivery data 12b as the number of times of loops to its counter (Step 605).

Then, in the case where the character size obtained from the delivery data 12b is different from the storage size of the font file 7b of the reception side conversion processor, the magnification or reduction processing is executed on the basis of the information as to the character size from the delivery data 12b (Step 606). Moreover, when data format of the character pattern (font) is different, the format conversion is executed so that the format matches with that of the reception side conversion processor (Step 607).

After completion of the above processing, the received external character is stored in the font file 7b of the conversion processor which is developed on the memory.

Thereafter, the correspondence between the codes of the circulating side code system and the circulated side code system, which is obtained from the delivery data 12b is written in the code conversion table 11b of the conversion processor, which is developed on the memory (Step 609).

After the processing of the above steps 605 to 609 is repeated by the number of characters set in the counter, the code conversion table 610 developed on the memory is rewritten in the storage device (Step 610), and the updated font file 7b is closed (Step 611).

In the above description, the information processing system 5a of the mainframe is at the transmission side whereas the information processing system 5b of the work station is at the reception side. However, any of the information processing system 5a, 5b and 5c may be at the transmission or reception side. In other words, it is possible that the contents of database 6c for person's names containing the external characters inputted by the branch office (information processing system 5c) and newly prepared are reflected on the area center branch office (information processing system 5b) and the head office (information processing system 5a) over the telecommunication line 3, and are then displayed on their display units 8b and 8c.

As described above, the circulation of the external code converted through the telecommunication line 3 is realized, and the character pattern (font) per se can be circulated. As a result, it is unnecessary to reprepare the external character for every platform, and the databases for the person's names or the like including the external character can be uniformly managed between the platforms having different code systems.

Moreover, the conversion processors 10a and 7b repeat the flowcharts shown in FIGS. 4 and 6 periodically, whereby, when the external character is updated in any platform, this updating can be reflected on other platforms quickly.

(PROCESSING FOR MAKING THE CONVERSION TABLE PER SE TO BE CIRCULATED)

In the above description, in the circulation of the information as to the external character, the information including the character pattern (font data) is circulated between the platforms. However, without the circulation of the character pattern or additional information as to the character, only the contents of the code conversion table 11a may be circulated over the telecommunication line 3.

Figure 7:
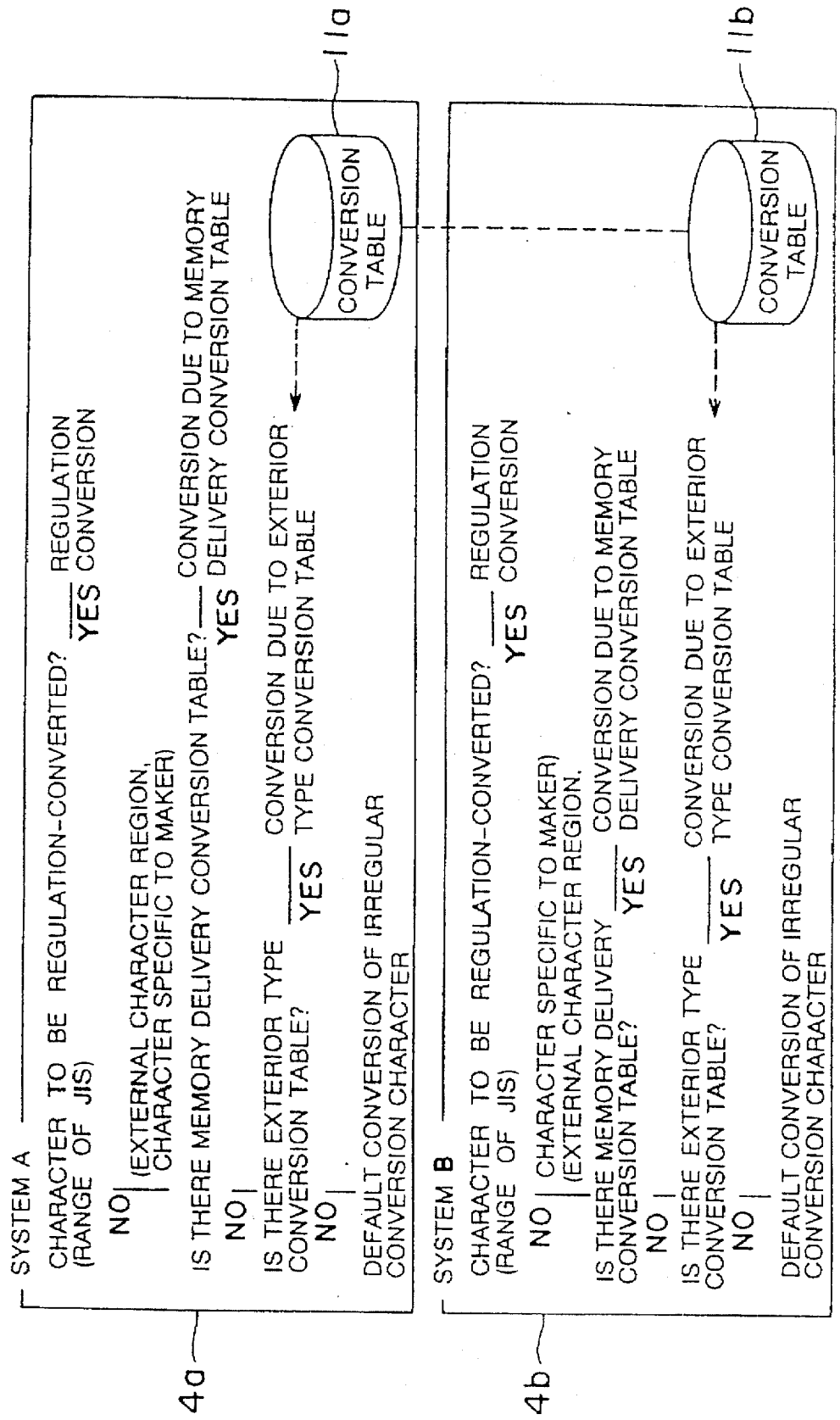
FIG. 7 is a block diagram showing a conversion processing using a code conversion table.

FIG. 7 shows the processing outline when only the code conversion table 11a is circulated between the platforms. For simplification of the description, the outline of the structure will be described with reference to FIG. 3.

Therefore, in FIG. 7, a system A represents a processing in the transmission side character code managing device 4a shown in FIG. 3 whereas a system B is a processing in the reception side character code managing device 4b shown in FIG. 3.

First of all, in the transmission side conversion processor 10a of the transmission side character code managing device 4a, it is judged whether a character to be converted is a character of a regulation conversion, for example, a character in the range of JIS, or not. As a result, because the regulation conversion of the character defined by JIS can be made, the character is converted into the character code corresponding to the opponent system by a regulation conversion program of the conversion processor, and then transmitted.

Also, in the case where the character to be converted is out of an object to be regulation-converted, for example, in the case of the external character or character specific to a maker, it is judged whether the character exists in a memory delivery conversion table, or not. The memory delivery conversion table is directed to a case where its conversion regulation is transmitted to the reception side system together with data to be circulated, and the regulation is developed on the memory in the reception side system.

In the case of a character which does not exist in the memory delivery conversion table, it is judged whether the character exists in an exterior type code conversion table 11a, or not. When executing the conversion by the exterior type code conversion table 11a, the transmission side conversion processor 10a converts the character code on the basis of the code conversion table 11a, and transmits it to the reception side system.

On the other hand, in the case of a character which does not exist even in the exterior type code conversion table 11b, a default conversion is executed for an irregular conversion character. This is a process of making a code to which a code meaning an unconvertible character is assigned.

Similarly, in the reception side character code managing device 4b, the same processing as that of the transmission side character code managing device 4a is executed. When the exterior type code conversion table 11b is inconsistent with the transmission side exterior type code conversion table 11a, the default conversion of an irregular conversion character may be executed depending on the kind of the character code. For this reason, in this embodiment, the code conversion table 11a per se is designed to be transmitted to the reception side character code managing device 4b through the telecommunication line as the delivery data 12a.

FIG. 8 shows a format when the contents of the code conversion table 11a is transmitted as the delivery data 12a.

This file is constituted by a head portion 20 and a data portion 21, and the header portion 20 includes a "file identification name", a "header length", a "character code corresponding number", a "reserve region" (128 bytes), a "corresponding character code system number", and "character code system information tables 1 to 20".

In the data portion 21, a character code correspondence table between the character code systems is registered.

In the reception side character code managing device 4b which receives the file as the delivery data 12b, the reception side conversion processor 10b reads it and updates the code conversion table 11b thereof.

The above description was given of an example in which a character pattern (font), a character information annexed to the character pattern, and a code conversion table are circulated between the respective character code managing devices 4a, 4b and 4c over the telecommunication line 3. However, as indicated by a broken line, only the font files 7a, 7b and 7c may be circulated by another line, or a physical storage medium such as a floppy disc.

What is claimed is:

1. A character information transfer processing system in information processing devices having different character coding schemes for character fonts and mutually connected over a communication line, said system comprising:

transmission side character code managing means comprising:
   transmission side code converting means for converting a transmission side nonstandard character font into a character code string based on a reception side character coding scheme for reception side character fonts to output a converted character code to said communication line,
   transmission side character string storing means for storing a transmission side character coding scheme for transmission side character fonts; and reception side character code managing means comprising:
   reception side code converting means for applying the converted character code to generate the corresponding reception side nonstandard character font of the reception side character coding scheme, and reception side character string storing means for storing the reception side character coding scheme for the reception side character fonts, wherein said transmission side code converting means further comprises:

a conversion processor to calculate a reception side external character code address in said reception side character string storing means corresponding to a transmission side external character code address in said transmission side character string storing means for the transmission side nonstandard character font; and a code conversion table to register the transmission side external character code address of said transmission side character string storing means for the transmission side nonstandard character font and the reception side external character code address of said reception side character string storing means calculated by said conversion processor to correspond thereto.

2. A character information transfer processing system as claimed in claim 1, wherein said conversion processor comprises:

means for opening a font file;

means for accessing said code conversion table;

means for retrieving character pattern data for the transmission side nonstandard character font from said transmission side character string storing means to be transmitted to said reception side character code managing means;

means for calculating the reception side external character code address in said reception side character string storing means corresponding to the transmission side external character code address in said transmission side character string storing means for the transmission side nonstandard character font;

means for registering, in said code conversion table, the reception side external character code address of said reception side character string storing means and the transmission side external character code address of said transmission side character string storing means for the transmission side nonstandard character font; and means for outputting delivery data containing said code conversion table, to said reception side character code managing means.

3. A character information transfer processing system as claimed in claim 1, wherein said transmission side code converting means further comprises character pattern processing means for retrieving an external character pattern for the transmission side nonstandard character font from said transmission side character string storing means and for converting the external character pattern into a corresponding character code of said reception side character string storing means that is output as the converted character code to the communication line.

4. A character information transfer processing system as claimed in claim 1, wherein said transmission side code converting means further comprises conversion information communicating means for transmitting conversion information registered in said code conversion table to said reception side character code managing means through the communication line.

5. A character information transfer processing system for managing information processing devices coupled by a communication line, comprising:

a transmission side character string storage device to store a transmission side character font coding scheme for transmission side character fonts;

a reception side character string storage device to store a reception side character font coding scheme for reception side character fonts, the reception side character font coding scheme being different from the transmission side character font coding scheme;

a transmission side code converting device, coupled to said transmission side character string storage device and to the communication line, to calculate a reception side external character address in said reception side character string storage device for at least one of the reception side character fonts corresponding to a transmission side external character address for at least one of the transmission side character fonts, and to output a converted character code containing the transmission side external character address and the reception side external character address corresponding thereto for transmission over the communication line; and a reception side code converting device, coupled to said reception side character string storage device and to the communication line, to receive the converted character code outputted by said transmission side code converting device, and to generate the at least one of the reception side character fonts based on the converted character code.

6. A method to manage information processing devices coupled by a communication line, comprising the steps of:

storing a transmission side character font coding scheme for transmission side character fonts in a transmission side character string storage device;

storing a reception side character font coding scheme for reception side character fonts in a reception side character string storage device, the reception side character font coding scheme being different from the transmission side character font coding scheme;

retrieving a transmission side external character address in the transmission side character string storage device for at least one of the transmission side character fonts;

calculating a reception side external character address in the reception side character string storage device for at least one of the reception side character fonts corresponding to the transmission side external character address for the at least one of the transmission side character fonts;

transmitting a converted character code, containing the transmission side external character address and the reception side external character address corresponding thereto and calculated by said step of calculating, over the communication line; and, generating the at least one of the reception side character fonts based on the converted character code.

* * * * *